V. H. SLINACK.
VALVE FOR LIGHTING FIXTURES.
APPLICATION FILED JAN. 9, 1911.

1,089,503.

Patented Mar. 10, 1914.

WITNESSES:
Rob't R. Kitchel.
R. M. Gilligan

INVENTOR
Victor H. Slinack
BY
Augustus B. Stoughton
ATTORNEY.

UNITED STATES PATENT OFFICE.

VICTOR H. SLINACK, OF PHILADELPHIA, PENNSYLVANIA, ASSIGNOR TO PENNSYLVANIA GLOBE GAS LIGHT COMPANY, OF PHILADELPHIA, PENNSYLVANIA, A CORPORATION OF PENNSYLVANIA.

VALVE FOR LIGHTING-FIXTURES.

1,089,503. Specification of Letters Patent. Patented Mar. 10, 1914.

Application filed January 9, 1911. Serial No. 601,735.

*To all whom it may concern:*

Be it known that I, VICTOR H. SLINACK, a citizen of the United States, residing at the city of Philadelphia, in the county of Philadelphia and State of Pennsylvania, have invented a certain new and useful Valve for Lighting-Fixtures, of which the following is a specification.

Valves arranged in the supply pipes of gas lights, such as so-called incandescent gas arc lights, are subjected to heat and cold or temperature changes and these changes interfere with the operation of such valves as have heretofore been provided or used and cause the movable valve parts to stick and an effort to move such parts frequently results in dis-arrangement or breakage of the mantle or other accessories of the light.

Objects of the present invention are to overcome and obviate such defects and disadvantages and to provide a gas valve for lighting fixtures, the parts of which will not stick or jam upon exposure to varying temperatures; to prevent the extinguishment of both the pilot and main burners at the same time; to avoid the use of comparatively small ports or channels such as become stopped with rust or the like; and to provide a simple, comparatively inexpensive and reliable valve adapted to withstand changes of temperature and to properly control the supply to main and pilot burners.

The invention will be claimed at the end hereof but will first be described in connection with the accompanying drawings forming part hereof and in which—

Figure 1:
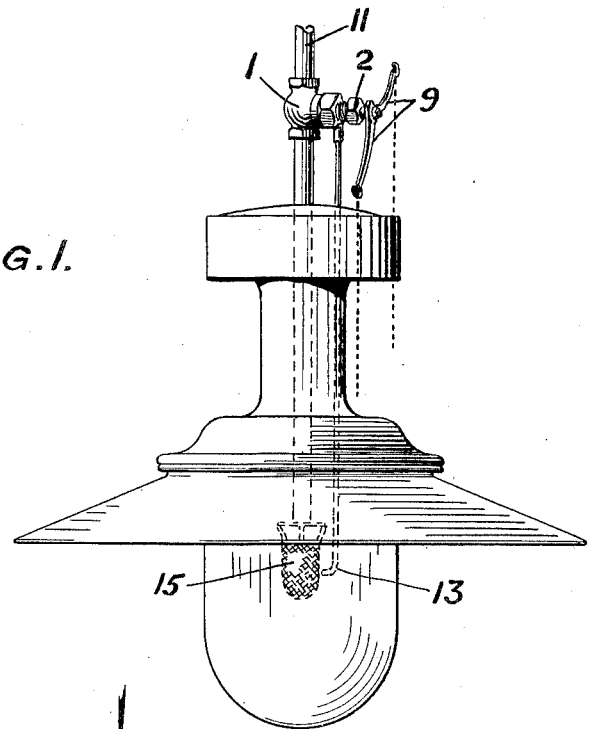
Figure 2:
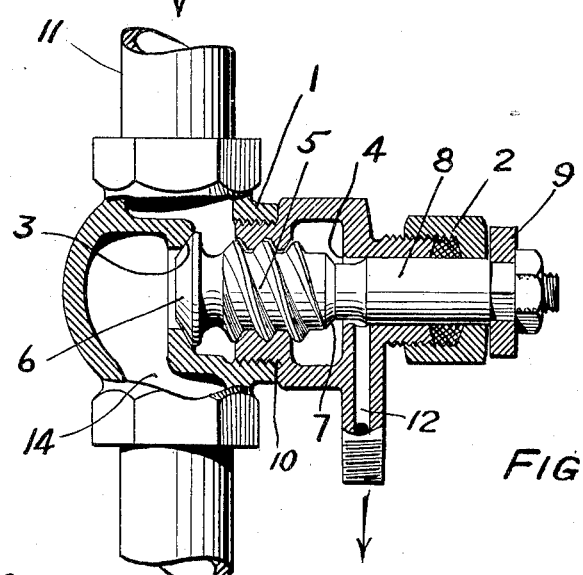

Figure 1, is a side view illustrating a valve embodying features of the invention in application to a light, and Fig. 2, is a view, principally in central section and drawn to an enlarged scale in order to illustrate the valve shown in Fig. 1.

In the drawings 1, is a casing having at one end a gland or stuffing box 2, and having valve seats 3 and 4, spaced apart.

5, is a plug having screw and thread connection with the casing and having end valves 6 and 7, spaced nearer together than the seats 3 and 4.

8, is a stem projecting from the plug and extending through the stuffing box or gland 2.

9, is an operating yoke attached to the stem and usually fitted with depending chains or rods, not shown, by means of which it is operated.

The casing is shown as consisting of two parts screwed together as at 10, but this is merely one way of making it.

When the parts are in the position shown in Fig. 2, with the plug 5, at the limit of its lefthand travel, the valve 6, covers the valve seat 3. Thus gas entering through the main pipe 11, passes around or past the screw and thread connection between the plug and casing which connection can be made loose for this purpose and the gas passes between the valve 7, and its valve seat 4, and enters the passage 12, which leads to the pilot burner 13. When the part 5, is at the righthand limit of its travel the valve 7, covers the valve seat 4, and gas passes past the valve 6, and its seat 3, through the passage 14, to the main burner 15 and the valve 7, covers the seat 4, and cuts off the supply to the pilot light.

From the described construction it is evident that the supply either to the main burner or to the pilot burner may be cut off and that the supply to both of them cannot possibly be cut off at the same time. Furthermore there are no small ports or openings such as are likely to be stopped and the plug and its valves may not stick and can be readily operated by a movement of the yoke or arm 9.

What I claim is:

1. A gas valve for lighting fixtures comprising the combination of a casing having two gas outlets constituting valve seats with a coarsely threaded portion between them, a threaded plug loosely engaging the threaded portion of the casing so as to provide a passage for gas and having two valves whereof one covers one and the other uncovers the other of said outlets, a gas supply inlet communicating at all times with both said valved outlets, and a spindle for the plug whereby a partial turn of the latter opens one and closes the other of the outlets.

2. A gas valve for lighting fixtures comprising the combination of an internally threaded casing having two outlets and to the space between which gas is at all times admitted, a gas supply inlet communicating with said space, a threaded plug engaging a threaded part of the casing and having two valves whereof one closes one and opens the other outlet in one position of the plug and whereof the other closes one and opens the other outlet in the other position of the plug, and a spindle for turning the plug.

In testimony whereof I have hereunto signed my name.

VICTOR H. SLINACK.

Witnesses:
S. E. PATTERSON,
K. M. GILLIGAN.

---

Copies of this patent may be obtained for five cents each, by addressing the "Commissioner of Patents, Washington, D. C."